United States Patent
Hou et al.

(10) Patent No.: US 9,439,202 B1
(45) Date of Patent: Sep. 6, 2016

(54) SYSTEMS AND METHODS FOR ALLOCATING RESOURCES BETWEEN FREQUENCY BANDS IN A WIRELESS NETWORK

(71) Applicant: Sprint Spectrum LP, Overland Park, KS (US)

(72) Inventors: Pei Hou, Herndon, VA (US); Muhammad Ahsan Naim, Sterling, VA (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 21 days.

(21) Appl. No.: 14/481,906

(22) Filed: Sep. 9, 2014

(51) Int. Cl.
*H04W 72/00* (2009.01)
*H04W 72/04* (2009.01)
*H04W 72/08* (2009.01)
*H04W 72/10* (2009.01)

(52) U.S. Cl.
CPC ..... *H04W 72/0493* (2013.01); *H04W 72/0453* (2013.01); *H04W 72/08* (2013.01); *H04W 72/10* (2013.01)

(58) Field of Classification Search
CPC ............... H04W 72/0493; H04W 72/0453; H04W 72/08; H04W 72/10
USPC .......................................................... 455/450
See application file for complete search history.

(56) References Cited

U.S. PATENT DOCUMENTS 6,910,074 B1 * 6/2005 Amin et al. ................ 709/227
2009/0029710 A1 1/2009 Ochiai et al.
2013/0010694 A1 1/2013 Yu et al.

* cited by examiner

*Primary Examiner* — Nader Bolourchi (57) ABSTRACT

Systems and methods are described for allocating resources between frequency bands in a wireless network. A wireless device may establish multiple default channels for wireless communication with two or more cells associated with different frequency bands. The default channels on each of the cells may be used to communicate control signals between the two or more cells and the wireless device. Application requirements may be determined and each of the cells may assign a dedicated channel for service, and one of the dedicated channels may be selected to provide service to the wireless device based on the determined application requirements.

18 Claims, 6 Drawing Sheets

SYSTEMS AND METHODS FOR ALLOCATING RESOURCES BETWEEN FREQUENCY BANDS IN A WIRELESS NETWORK

TECHNICAL BACKGROUND

Wireless network resources may include multiple frequency bands for carrying wireless communication signals. The frequency bands may depend on different access node technologies, or may be sub-groups of a larger frequency band on which a particular radio access technology is configured to operate. The frequency bands may be defined by an approximate center frequency, and the band may cover frequencies within a specific spectrum surrounding the approximate center frequency.

A wireless device in a wireless network may be capable of establishing a wireless connection with each of two or more cells, each cell belonging to a different frequency band. Initially, a wireless device may detect a system information signal from each cell. If the system information signal for each cell is above a threshold signal level for that cell, the wireless device may attempt to connect to at least one cell in each of at least two different frequency bands in order to establish a default control channel on the two or more cells. Once wireless communication is established, these two or more cells may transmit and receive information such as application requirements of the wireless device and network characteristics of each of the cells, or of neighboring access nodes. The default control channel on each of the two or more cells may be used to prepare network resources on each cell by allocating a dedicated channel for services requested by the wireless device. The application requirements may be used to select a suitable dedicated channel.

Overview

Systems and methods are described for allocating resources between frequency bands in a wireless network. A wireless device may identify that there are a plurality of cells associated with different frequency bands. Accordingly, the wireless device may establish wireless communication with a first default channel of a first cell associated with a first frequency band and with a second default channel of a second cell associated with a second frequency band to communicate control signals between the first and second cells and the wireless device.

Application requirements for the wireless device may be determined by the cells or by another network node. Each of the first and second cells may assign a dedicated channel to bear data for the services required by an application of the wireless device. When the application requirements are determined, either of the first or second dedicated channels may be selected to provide service based on the determined application requirements.

DETAILED DESCRIPTION

Figure 1:
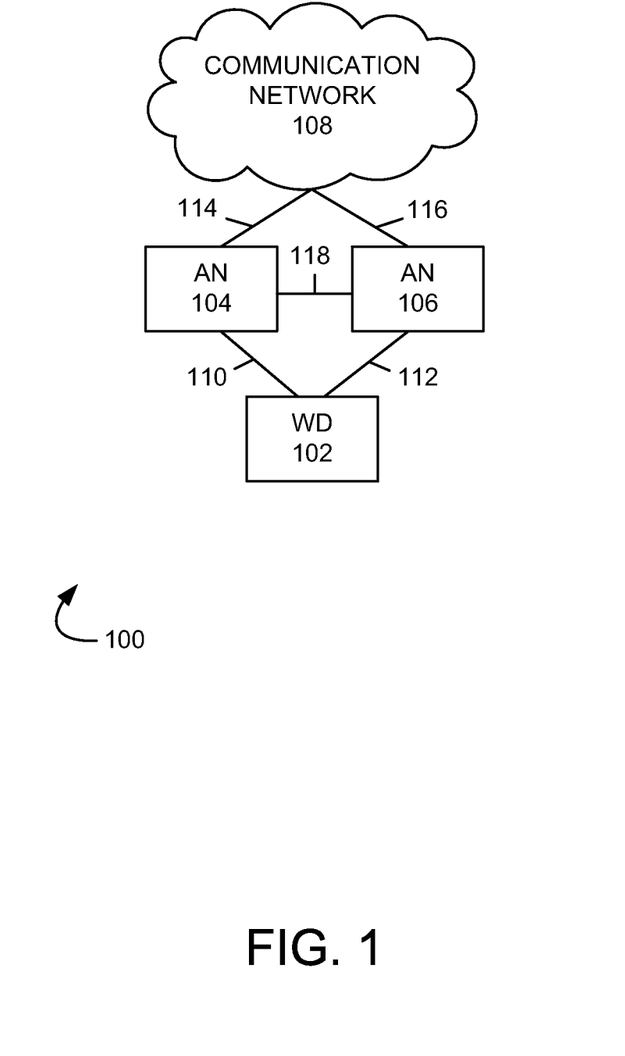
FIG. 1 illustrates an exemplary communication system used to allocate resources between frequency bands in a wireless network.

FIG. 1 illustrates an exemplary communication system 100 to allocate resources in a wireless network comprising wireless device (WD) 102, access nodes (AN) 104 and 106, communication network 108, and communication links 110, 112, 114, and 116. Each of the access nodes may have a plurality of cells in one or more frequency bands. The cells of access node 104 may be associated with a different frequency band than the cells of access node 106.

Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 104 and 106, any number of wireless devices can be implemented.

Access nodes 104 and 106 are network nodes capable of providing wireless communications to wireless device 102, and may be, for example, a base transceiver station, a radio base station, a NodeB device, or an eNodeB device. Access nodes 104 and 106 may communicate with communication network 108 over communication links 114 and 116. Access nodes 104 and 106 may also communicate directly with each other over communication link 118. In an embodiment, access node 104 may comprise a serving access node for wireless device 102.

Although only two access nodes 104 and 106 are illustrated in FIG. 1, wireless device 102 can be in communication with additional access nodes. The plurality of access nodes may be associated with different networks and may support different communication protocols and radio access technologies.

Communication network 108 may comprise a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or other types of communication equipment, as well as combinations thereof.

Communication links 110, 112, 114, 116, and 118 may be wired or wireless communication links. Wired communication links may comprise, for example, twisted pair cable, coaxial cable, or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, WiMAX, or 3GPP LTE, or combinations thereof. Other wireless protocols can also be used.

Figure 2A:
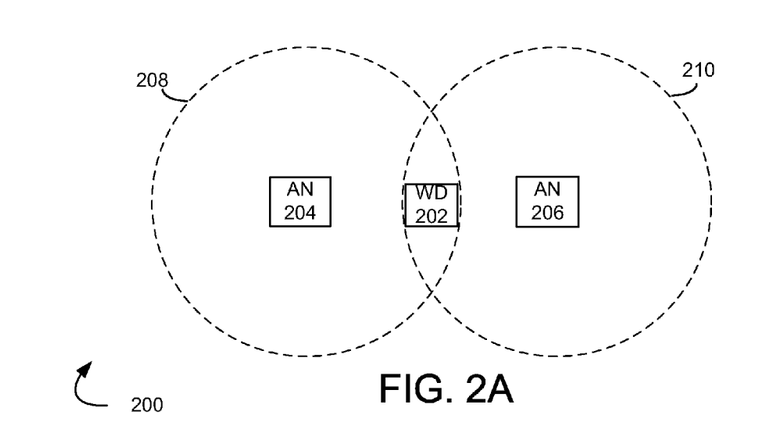
FIGS. 2A and B illustrate other exemplary systems used to allocate resources between frequency bands in a wireless network.

FIG. 2A illustrates an exemplary communication system 200 to allocate resources between frequency bands in a wireless network. System 200 comprises at least one wireless device 202, access nodes 204 and 206, and signal radii 208 and 210. While only one wireless device is shown, it is to be understood that there will typically be more than one wireless device in communication with each access node. Wireless device 202 may comprise a device similar to wireless device 102 of FIG. 1. Access nodes 204 and 206 may comprise access nodes similar to access nodes 104 and 106 of FIG. 1.

A signal radius, or coverage radius, may comprise an area around an access node within which a wireless device such as wireless device 202 can detect a signal transmitted from the access node. Signal radius 208 may comprise a radius for a system information signal transmitted from access node 204; signal radius 210 may comprise a radius for a system information signal transmitted from access node 206.

Figure 2B:
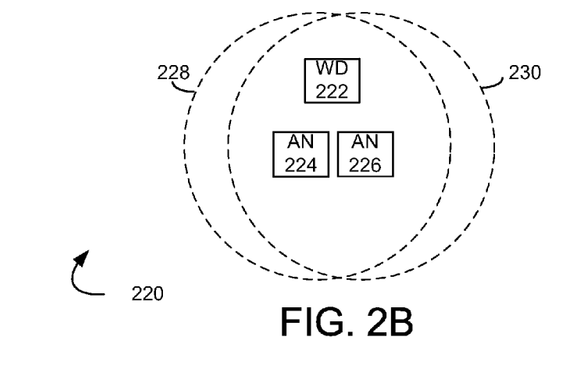

FIG. 2B illustrates an exemplary communication system 220 to allocate resources between frequency bands in a wireless network. System 220 comprises at least one wireless device 222, access nodes 224 and 226, and signal radii 228 and 230. While only one wireless device is shown, it is to be understood that there will typically be more than one wireless device in communication with each access node. Wireless device 222 may comprise a device similar to wireless device 102 of FIG. 1. Access nodes 224 and 226 may comprise access nodes similar to access nodes 104 and 106 of FIG. 1.

A signal radius, or coverage radius, may comprise an area around an access node within which a wireless device such as wireless device 222 can detect a signal transmitted from the access node. Signal radius 228 may comprise a radius for a system information signal transmitted from access node 224; signal radius 230 may comprise a radius for a system information signal transmitted from access node 226. Depending upon deployment of access nodes, cells that are associated with multiple frequency bands may be located alongside one another, or even co-located at a single access node similar to any of the embodiments previously described.

FIG. 2B illustrates a non-limiting, exemplary embodiment in which access nodes 224 and 226 have cells that are associated with different frequency bands, and the signal radii 228 and 230 for these access nodes overlap significantly, though as noted above, the particular overlap shown does not limit the scope of the claims in any way.

While the following teachings relate to an operation of system 200 having the wireless device 202 and access nodes 204 and 206, these teachings apply equally to system 220 having wireless device 222 and access nodes 224 and 226. In operation, wireless device 202 may establish communication with both of access nodes 204 and 206, such that access nodes 204 and 206 provide the wireless device 202 with a default channel for transmission of control signals prior to accessing a communication network (such as communication network 108, illustrated in FIG. 1) for the purposes of accessing data or voice services, or hybrid services such as video. Access nodes 204 and 206 may transmit system information signals over signal radii 208 and 210, which are illustrated in a merely exemplary embodiment of the present teachings.

Wireless device 202 is able to detect the signals from access nodes 204 and 206 when wireless device 202 is within the signal radii of both access nodes. When wireless device 202 detects the system information signal from access node 204 and it is determined that the system information signal from access node 204 meets a threshold signal level, wireless device 202 may attempt to establish communication with access node 204. For example, the signal level may be represented by received signal strength indication (RSSI), system information signal received power (RSRP), reference signal received quality (RSRQ), signal to interference plus noise ratio (SINR), or any other suitable metric.

In an embodiment, when the system information signal from access node 204 meets a threshold signal level, wireless device 202 attempts to establish a wireless connection with cells of both access nodes 204 and 206, each of the cells with which a wireless connection is established being associated with distinct frequency bands. The access nodes 204 and 206 may prepare to allocate resources for services anticipated to be provided to the wireless device 202. In an embodiment, once a preliminary connection on a default channel has been made, the wireless device 202 may transmit application requirements to determine which of the access nodes has prepared to allocate a channel having a delay, error rate, bitrate, or other metric of quality best suited for a service indicated by the application requirements.

In an embodiment, communication system 200 may be configured to manage access node neighbor relations. For example, communication system 200 may implement a self-organizing network (SON) protocol that includes an automatic neighbor relations (ANR) process, or may implement any other suitable protocol for managing access node neighbor relations.

In an embodiment, access nodes 204 and 206 may be identified by any wireless device in range of both access nodes, such as wireless device 202. The access nodes may be identified by information such as physical cell identifiers (PCI), cell global identifications (CGI), E-UTRAN cell identifiers (ECI), E-UTRAN cell global identifiers (ECGI), eNodeB identifiers (eNB-ID), or the like. The wireless device may determine the signal levels for identified access nodes, as well as the frequency band of each cell of the access nodes. Access nodes may also provide connection information (e.g., X2 connection information), handover information, and other relevant neighbor information to determine network characteristics of nearby cells, including the frequency bands associated with each cell.

In this exemplary embodiment, cells within access node 204 and access node 206 are associated with different frequency bands. In response to a network event, wireless device 202 may transmit a measurement report to a network node comprising one or more signal levels and band information for each system information signal or pilot signal received at the wireless device from access nodes such as access nodes 204 and 206 having signal radii that cover the area in which the wireless device is located, and at least one identifier (e.g., PCI, CGI, ECI, ECGI, eNB-ID, or the like) for each reported access node and cell. In an embodiment, the measurement report may comprise signal levels above a specified limit (e.g., a signal level threshold).

Access node 202 may initiate, based on the measurement report, a process to establish wireless communication with two or more access nodes such as those shown in FIG. 2A as access nodes 204 and 206. A communication link between access nodes 204 and 206, or between these access nodes and neighboring access nodes, may be established at any point before or during the process of establishing wireless services. In a merely exemplary embodiment, access nodes 204 and 206 may communicate with each other through an X2 connection to coordinate information such as assigned channels.

Figure 3:
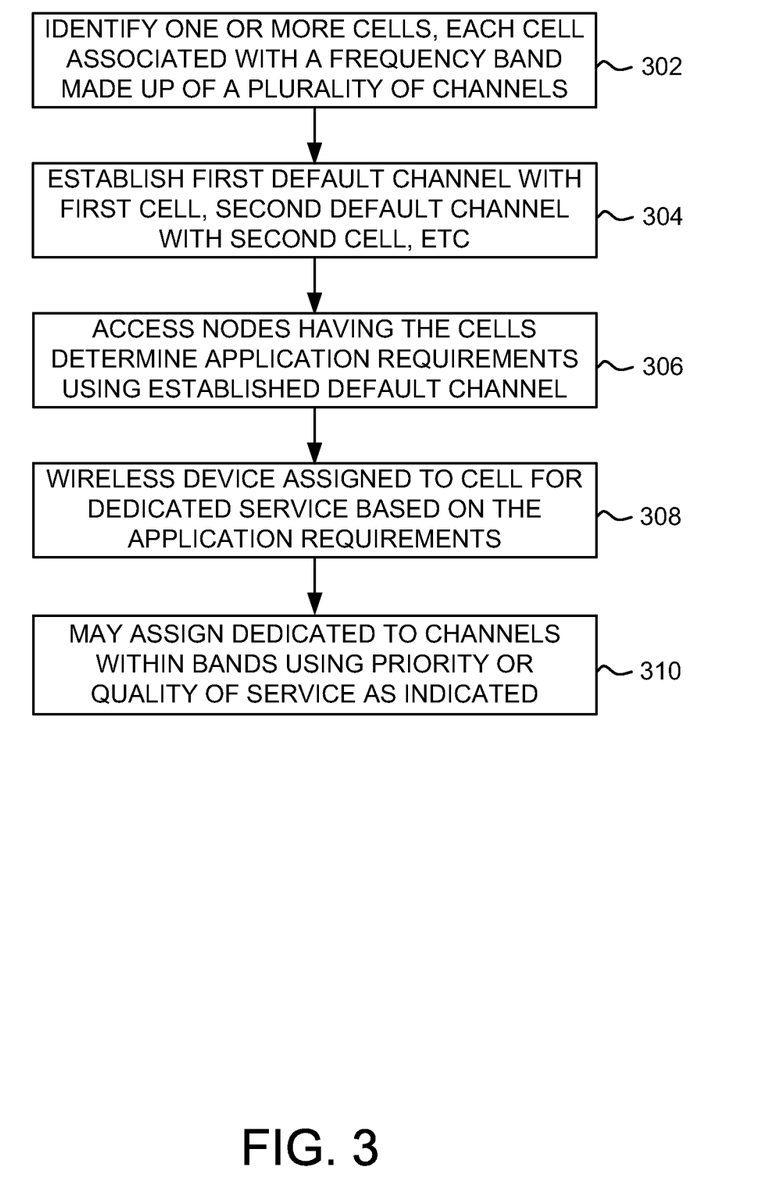
FIG. 3 illustrates an exemplary method of allocating resources between frequency bands in a wireless network.

FIG. 3 illustrates an exemplary method for allocating resources between frequency bands in a wireless network. The method will be discussed with reference to the exemplary communication system 200 illustrated in FIG. 2A. However, the method may also be implemented with any other suitable communication system, such as the communication system 220 illustrated in FIG. 2B, or a system in which multiple cells associated with distinct frequency bands are co-located at a single access node.

It may be desirable to establish a preliminary wireless connection between each cell and the wireless device. This preliminary connection may be established on a default channel of each cell. The preliminary connection may allow the cells to execute control protocols with the wireless device. Based on anticipated application requirements of the wireless device, each of the cells may determine available resources and assign the wireless device to the default channel having a default priority based on anticipated incoming service and suitability of the frequency band of each cell to provide service in the desired service area of the wireless device.

Application requirements may comprise a quality of service, a type of service, or another suitable metric of anticipated network resource demands of a desired application. In an exemplary embodiment, application requirements may comprise a type of service, such as voice, data, or a combination of multiple sources. One access node in a particular frequency band may be better suited to initiate and maintain voice services or other types symmetrical traffics for both downlink and uplink while another frequency band may be used for data services, which tend to be more intermittent and unsymmetrical downlink and uplink traffics. Services which are not as persistent may be assigned to channels that do not have a guaranteed bit rate (GBR), or other similar indicator of services provided on the channel. In addition, services which tend to have unsymmetrical downlink and uplink traffics patterns may be assigned to channels that have more resources to support such traffic pattern. It may be desirable to assign services that tend to be periodic and continuing, such as voice, to channels having a GBR. Application requirements may also be directed to minimizing delay or packet loss in a particular channel.

In an embodiment, the first and second cells may assign the wireless device to a default channel for control signals based on the type of services anticipated. Each cell may also allocate resources in a dedicated channel for a later time period, and one of the dedicated channels may be selected based on actual application requirements.

Referring to FIG. 3, at step 302, signal information for one or more access nodes may be received by the wireless device in response to a reporting event triggered at the wireless device. The reporting event may be based on relative signal levels between access nodes. However, the reporting event may also be based on scheduled access node maintenance or monitoring, or any other relevant network event. Regardless of the type of reporting event, the received signal information may be used to identify cells of access nodes, as well as the frequency band of each cell. This signal information may also be stored and transmitted to access nodes or other network nodes involved in handovers.

In one exemplary embodiment, wireless device 202 may receive a system information signal from access node 204 at a received signal level and a system information signal from access node 206 at a received signal level. In an embodiment, a reporting event may be triggered at the wireless device 202 based on at least the received first signal level and the received second signal level. In response to the reporting event, wireless device 202 may transmit signal information comprising a signal level for the system information signal received from access node 206 and an identifier for access node 206 (e.g., PCI, CGI, ECI, ECGI, eNB-ID, or the like). While access nodes 204 and 206 are the only ones shown, it is to be understood that there may be a plurality of access nodes similar to access nodes 204 and 206 from which wireless device 202 may receive system information signals.

Cells of access nodes 204 and 206 may belong to different bands. It may be desirable to initiate temporary default wireless communication channels with both of the access nodes to transmit and receive control signals, which may include information regarding dedicated resources in at least one channel providing data or voice services to access nodes 204 and 206. The establishment and assignment of wireless device 202 to the default channel of the access node 204 or of the access node 206 may be done before any data or voice services are actually transmitted or requested. Rather, there may be instances where it is desirable to assign default channels to cells associated with different frequency bands based on anticipated application requirements for which the particular frequency band of each access node is best suited.

At step 304, a first default channel is established with access node 204 and a second default channel is established with access node 206. These default channels may be used to transmit control signals as discussed above, as well as to receive the application requirements from the wireless device 202, as discussed in greater detail in the following step.

At step 306, the established default channels may also be used to transmit application requirements of the wireless device. In an exemplary embodiment, wireless device 202 may transmit to the cells of access nodes 204 and 206 whether the type of service demanded is or will be voice. In another exemplary embodiment, the demanded service indicated by the application requirements may be data, or data and voice combined.

At step 308, based on the determined application requirements, the suitable access node will establish a dedicated channel for that service, and the wireless device may be assigned to the access node which has established a dedicated channel suited for voice services. For example, if the application is voice service, it may be desirable for access node 204 to establish a dedicated channel with a GBR and low delay. In this exemplary embodiment, wireless device 202 will be assigned to access node 204 based on the application requirements for voice services. In this example, no dedicated channel will be established on access node 206.

At step 310, the access node to which the wireless device is assigned may further assign the dedicated channel based on a priority or quality of service as indicated by continued wireless communication with the access node. If application requirements change, it may be necessary to change the wireless device to another channel on the same access node or to handover the wireless device to a cell of another access node associated with a different frequency band better suited to the changed application requirements.

Figure 4:
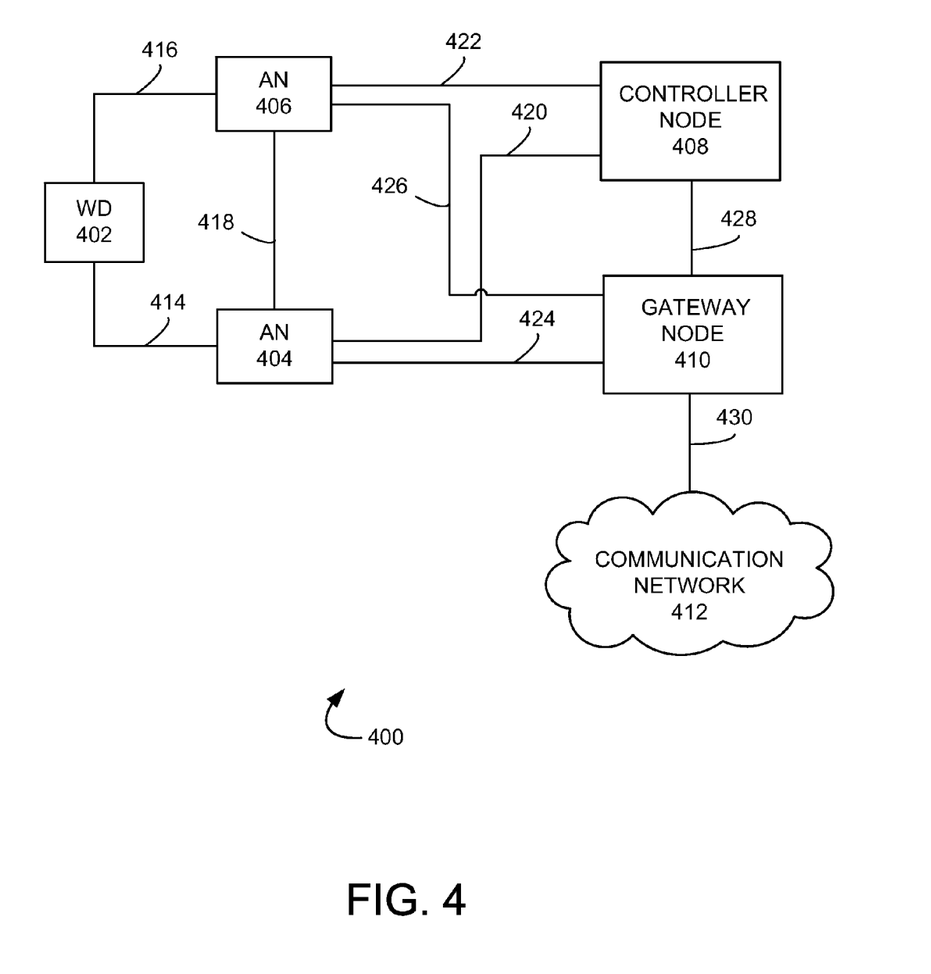
FIG. 4 illustrates another exemplary system used to allocate resources between frequency bands in a wireless network.

FIG. 4 illustrates another exemplary communication system 400 to determine a communication access node for a wireless device. Communication system 400 may comprise a wireless device 402, access nodes 404 and 406, controller node 408, gateway node 410, communication network 412, and communication links 414, 416, 418, 420, 422, 424, 426, 428, and 430. Other network elements may be present in the communication system 400 to facilitate communication but are omitted for clarity, such as base stations, base station controllers, gateways, mobile switching centers, dispatch application processors, and location registers such as a home location register or visitor location register.

Wireless device 402 can be any device configured to communicate over communication system 400 using a wireless communication link. For example, wireless device 402 can include a cell phone, a smart phone, a computing platform such as a laptop, palmtop, or a tablet, a personal digital assistant, or an internet access device, and combinations thereof.

Access nodes 404 and 406 are network nodes capable of providing wireless communications to wireless device 402, and can be, for example, a base transceiver station, a radio base station, a NodeB device, or an enhanced NodeB (eNodeB) device. In an embodiment, access node 404 can comprise a serving access node for wireless device 402. Access nodes 404 and 406 may communicate with controller node 408 over communication links 420 and 422, and with gateway node 410 over communication links 424 and 426. Access nodes 404 and 406 may also communicate directly with each other over communication link 418.

Controller node 408 can be any network node configured to manage services within system 400. Controller node 408 may provide other control and management functions for system 400. The controller node 408 can be a single device having various functions or a plurality of devices having differing functions. For example, controller node 408 can include at least one of a multi-cell/multicast coordination entity (MCE), a mobility management entity (MME), a radio network controller (RNC), a mobile switching center (MSC), and combinations thereof. In an embodiment, controller node 408 may perform portions of the steps illustrated in the methods of FIGS. 3 and 5.

Controller node 408 can comprise a processor and associated circuitry to execute or direct the execution of computer-readable instructions to obtain information. Controller node 408 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 can comprise a processor and associated circuitry to execute or direct the execution of computer-readable instructions to obtain information.

Gateway node 410 is a network element which can comprise a processor and associated circuitry to execute or direct the execution of computer-readable instructions. Gateway node 410 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 410 can provide instructions to access nodes 404 and 406 related to channel selection in communications with wireless device 402. For example, gateway node 410 can comprise at least one of a serving gateway (SGW), a packet data network gateway (PDNGW), a cellular gateway (CGW), and combinations thereof.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet).

Communication network 412 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 414, 416, 418, 420, 422, 424, 426, 428, and 430 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 404 and 406, controller node 408, gateway node 410, and communication network 412 which are omitted for clarity, including additional processing nodes, routers, gateways, and physical and/or wireless data links for carrying data among the various network elements.

Figure 5:
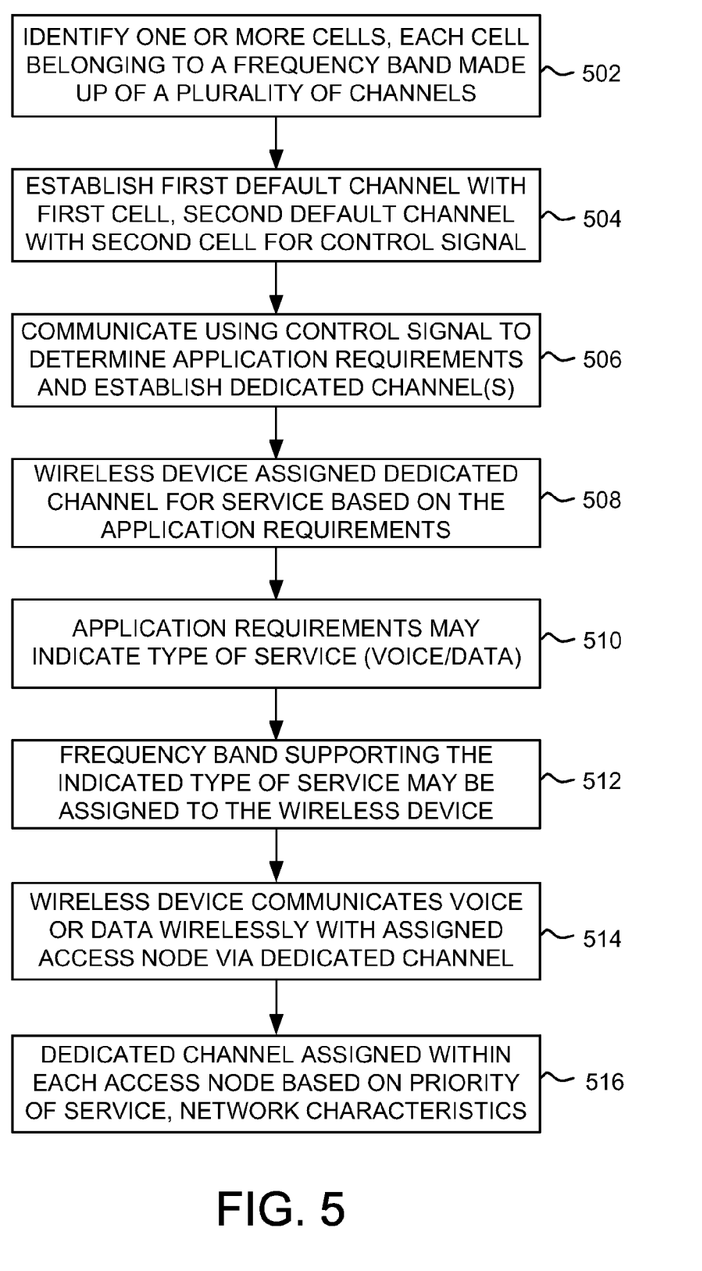
FIG. 5 illustrates another exemplary method used of allocating resources between frequency bands in a wireless network.

FIG. 5 illustrates an exemplary method for allocating resources between frequency bands in a wireless network. The method will be discussed with reference to the exemplary communication system 400 illustrated in FIG. 4, however, the method can be implemented with any suitable communication system.

Referring to FIG. 5, at step 502, signal information for one or more access nodes may be received by the wireless device in response to a reporting event triggered at the wireless device. The reporting event may be based on relative signal levels between access nodes. However, the reporting event may also be based on scheduled access node maintenance or monitoring, or any other relevant network event. Regardless of the type of reporting event, the received signal information may be used to identify cells of access nodes, as well as the frequency band of each cell. This signal information may also be stored and transmitted to access nodes or other network nodes involved in handovers.

In one exemplary embodiment, wireless device 402 may receive system information from access node 404 at a received signal level and system information from access node 406 at a received signal level. In an embodiment, a reporting event may be triggered at the wireless device 402 based on at least the received first signal level and the received second signal level. In response to the reporting event, wireless device 402 may transmit signal information comprising a signal level for the system information signal received from access node 406 and an identifier for access node 406 (e.g., PCI, CGI, ECI, ECGI, eNB-ID, or the like). While access nodes 404 and 406 are the only ones shown, it is to be understood that there may be a plurality of access nodes similar to access nodes 404 and 406 from which wireless device 402 may receive system information.

Cells of access nodes 404 and 406 may belong to different frequency bands, and each frequency band may be best suited for particular services based on such factors as interference, geographic location, or penetration through buildings. In an exemplary embodiment, the cells may belong to frequency bands such as 800 MHz, 1900 MHz, or 2500 MHz. Each of the frequency bands may be assigned to a default type of services. For example, data services may be assigned to the 2500 MHz frequency band, voice services may be assigned to the 1900 MHz or 800 MHz frequency band, and other combined services may be assigned to the 2500 MHz frequency band.

It may be desirable to initiate temporary default wireless communication channels within both of the access nodes to transmit and receive control signals, which may include information regarding dedicated resources in at least one channel providing data or voice services to access nodes 404 and 406. The establishment and assignment of wireless device 402 to either the default channel of the access node 404 or of the access node 406 may be done before any data or voice services are actually transmitted or requested. Rather, there may be instances where it is desirable to assign default channels to cells associated with different frequency bands based on anticipated application requirements for which the particular frequency band of each access node is best suited. The anticipated application requirements may also be used in preparation for establishment of dedicated resources in the form of a planned dedicated channel suited for a particular type of service.

At step 504, a first default channel is established with access node 404 and a second default channel is established with access node 406. These default channels may be used to transmit control signals as discussed above, as well as to receive the application requirements from the wireless device 402, as discussed in greater detail in the following step.

In the exemplary embodiment, access node 404 may be associated with the 2500 MHz frequency band, and may assign a default channel to transmit and receive control signals related to data services. Similarly, access node 406 may be associated with the 1900 MHz frequency band, and may assign a default channel to transmit and receive control signals related to voice services.

At step 506, the established default channels may also be used to transmit application requirements of the wireless device. In an exemplary embodiment, wireless device 402 may transmit to the cells of access nodes 404 and 406 whether the type of service demanded is or will be voice. In another exemplary embodiment, the demanded service indicated by the application requirements may be data, or data and voice combined. The default channels may also be used for control signals for allocating resources on dedicated channels on either cell based on the anticipated application requirements for which each access node has prepared resources in the form of a dedicated channel.

At step 508, the suitable access node may establish a dedicated channel for voice services, and the wireless device may be assigned to the access node which has established a dedicated channel suited for voice services. For example, if the application is voice service, it may be desirable for access node 406 to establish a dedicated channel with a GBR and low delay. In this exemplary embodiment, wireless device 402 will be assigned to access node 406 based on the application requirements for voice services. In this example, no dedicated channel will be established on access node 404. However, it may be desirable to maintain the default channels for both access node 404 and access node 406 if the wireless device is likely to experience a change in application requirements. This determination may be based on an analysis of historical data for application requirements to promote more efficient allocation of network resources between frequency bands, rather than handovers based solely on load.

At step 510, the access node to which the wireless device is assigned may further assign the dedicated channel based on a priority or quality of service (QoS) as indicated by continued wireless communication with the access node. There may be a particular QoS Class Identifier (QCI) assigned to a channel that is best suited for voice services, and so the access node may assign the wireless device to this channel. However, if application requirements change, it may be necessary to change the wireless device to another channel on the same access node or to handover the wireless device to a cell of another access node associated with a different frequency band better suited to the changed application requirements.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 6:
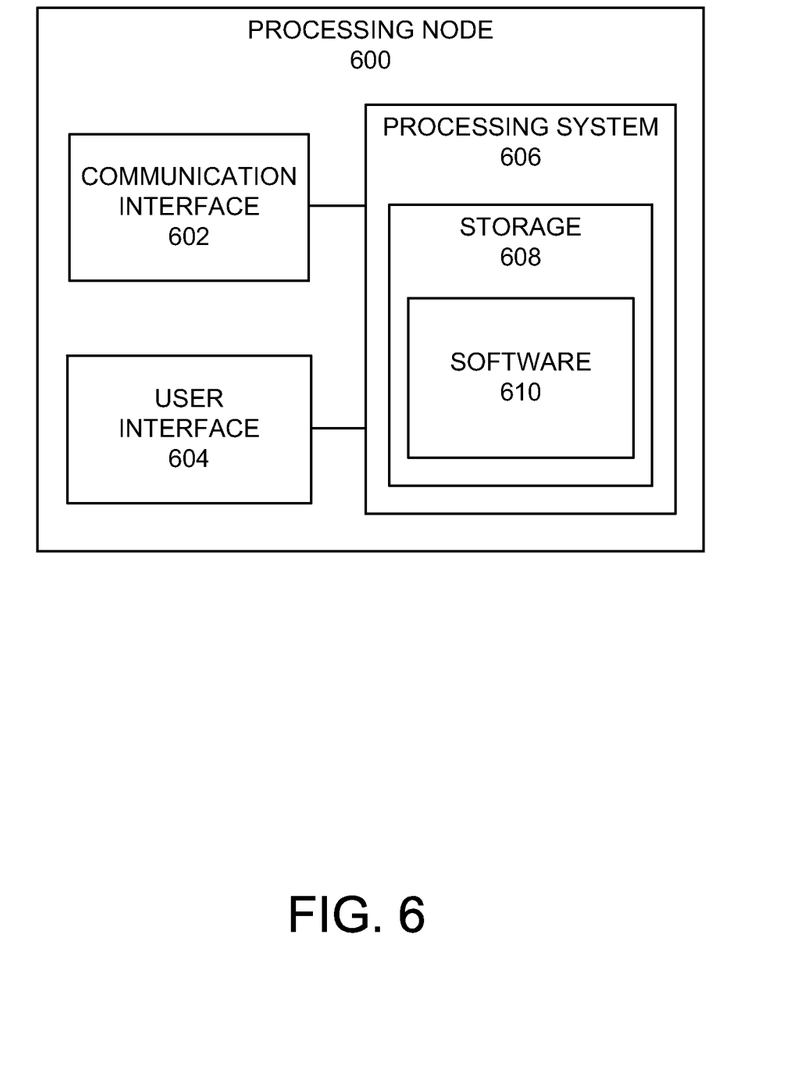
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include controller node 408 and gateway node 410. Processing node 600 can also be an adjunct or component of a network element, such as an element of access nodes 104, 106, 404, or 406. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for allocating resources between frequency bands in a wireless network, the method comprising:
    establishing a first default channel on a first cell associated with a first frequency band for communication with a wireless device and establishing a second default channel on a second cell associated with a second frequency band for communication with the wireless device, wherein the first default channel and the second default channel simultaneously communicate control signals between the first and second cells and the wireless device;
    determining application requirements of the wireless device; and
    assigning a first dedicated channel of the first cell and a second dedicated channel of the second cell, wherein the first or second dedicated channel is selected to provide service to the wireless device based on the determined application requirements,
    wherein each of the first and second frequency bands comprise distinct spectra that do not overlap, and
    wherein each of the distinct spectra are defined by a representative frequency at an approximate central point of said each distinct spectra for wireless signals transmitted between either of the first or second cells and the wireless device.

2. The method of claim 1, further comprising identifying each of the first and second cells within range of the wireless device by receiving at the wireless device a system information signal from each of the first and second cells.

3. The method of claim 2, further comprising determining signal level information for each of the first and second cells based on the system information signals received by the wireless device.

4. The method of claim 3, further comprising determining an associated frequency band for each of the first and second cells for which the system information signal is received above a threshold signal level and establishing the first default channel and the second default channel occurs upon determination that at least two cells are associated with different frequency bands.

5. The method of claim 1, wherein the first default channel and the second default channel are set up simultaneously during cell acquisition before any voice or data are transmitted between the wireless device and each of the first and second cells.

6. The method of claim 1, wherein the application requirements comprise a priority of service and each of the first and second cells allocates resources on default and dedicated channels based on the priority of service, and
    wherein establishing the first default channel and the second default channel further comprises assigning preselected channels for the control signals with each of the first cell and the second cell before data or voice are transmitted, the preselected channels being based on an anticipated type of service to be assigned to each of the first and second dedicated channels, and wherein assigning the wireless device to either the first dedicated channel or the second dedicated channel comprises assigning the wireless device to the first dedicated channel of the first cell when the priority of service for the wireless device is below a threshold level and assigning the wireless device to the second dedicated channel of the second cell when the priority of service is above a threshold level.

7. The method of claim 6, wherein the priority of service is related to quality of service indicators associated with the default and dedicated channels on the first and second cells.

8. A system for allocating resources between frequency bands in a wireless network, the system comprising:
at least one network node configured to:
establish a first default channel on a first cell of a first access node associated with a first frequency band for communication with a wireless device and establishing a second default channel on a second cell of a second access node associated with a second frequency band for communication with the wireless device, wherein the first default channel and the second default channel simultaneously communicate control signals between the first and second access nodes and the wireless device;
determine application requirements of the wireless device; and
assign a first dedicated channel of the first cell and a second dedicated channel of the second cell, wherein the first or second dedicated channel is selected to provide a type of service to the wireless device based on the determined application requirements,
wherein each of the first and second frequency bands comprise distinct spectra that do not overlap, and
wherein each of the distinct spectra are defined by a representative frequency at an approximate central point of said each distinct spectra for wireless signals transmitted between either of the first or second cells and the wireless device.

9. The system of claim 8, wherein each of the first and second cells of the first and second access nodes within range of the wireless device are identified by reports received from the wireless device regarding a system information signal from each of the first and second cells.

10. The system of claim 9, wherein the at least one network node is further configured to receive signal level information for each of the one or more first and second cells for which the system information signal above a threshold signal level was received by the wireless device.

11. The method of claim 10, wherein the at least one network node is further configured to receive, store, and transmit identifying information received by the wireless device for each of the first and second cells.

12. The method of claim 11, wherein the at least one network node is further configured to determine an associated frequency band for each of the first and second cells for which signal level information is received above a threshold signal level and to instruct the first and second cells to assign the first default channel and the second default channel upon determination that each of the first and second cells are associated with different frequency bands.

13. The system of claim 8, wherein the first default channel and the second default channel are set up simultaneously during cell acquisition before any voice or data are transmitted between the wireless device and each of the first and second cells.

14. The system of claim 8, wherein the application requirements determine a priority of service and each of the first and second cells assigns the wireless signals to default and dedicated channels based on the priority of service, and
wherein the first and second access nodes are configured to establish the first default channel and the second default channel on preselected channels for control signals with each of the first cell and the second cell before data or voice are transmitted, the preselected channels being based on an anticipated type of service to be assigned to each of the first and second dedicated channels, and
wherein the first access node is configured to assign the wireless device to the first dedicated channel when the priority of service for the wireless device exceeds a threshold level and the second access node is configured to assign the wireless device to the second dedicated channel when the priority of service is below a threshold level.

15. The system of claim 14, wherein the priority of service is related to quality of service indicators assigned for the default and dedicated channels on the first and second cells.

16. A method for allocating resources between a plurality of frequency bands in a wireless network, the method comprising:
receiving identifying information and signal level information at a wireless device for one or more cells in the wireless network and providing the identifying information to a network node;
determining for each of the one or more cells an associated frequency band from among the plurality of frequency bands;
simultaneously establishing a first default channel for first control signals between the wireless device and a first cell associated with a first distinct frequency band and a second default channel for second control signals between the wireless device and a second cell associated with a second distinct frequency band;
determining application requirements of the wireless device; and
assigning the wireless device to wirelessly communicate with a first dedicated channel of the first cell when the application requirements indicate a first type of service or a second dedicated channel of the second cell when the application requirements indicate a second type of service.

17. The method of claim 16, wherein the application requirements comprise a priority of service and each of the one or more cells allocates resources on default and dedicated channels based on the priority of service, and
wherein the preselected channels are assigned based on an anticipated type of service to be provided by each of the first and second dedicated channels, the first cell associated with the first frequency band anticipating voice services while the second cell associated with the second frequency band anticipating data services, and
wherein assigning the wireless device to either the first dedicated channel or the second dedicated channel comprises assigning the wireless device to the first dedicated channel of the first cell when the type of service is voice and assigning the wireless device to the second dedicated channel of the second cell when the type of service is data.

18. The method of claim 17, wherein the priority of service is related to quality of service indicators assigned for the default and dedicated channels on the first and second cells.

* * * * *